United States Patent

Dehn

[15] 3,701,848
[45] Oct. 31, 1972

[54] TESTING CIRCUIT FOR A SECRET SIGNALING SYSTEM
[72] Inventor: Joseph W. Dehn, Great Neck, N.Y.
[73] Assignee: Bell Telephone Laboratories, Incorporated, New York, N.Y.
[22] Filed: July 14, 1944
[21] Appl. No.: 544,944

[52] U.S. Cl..................................179/1.5, 179/175.2
[51] Int. Cl..........................H04m 1/68, H04m 3/22
[58] Field of Search............................179/1.5, 175.2

[56] References Cited

UNITED STATES PATENTS 2,006,472  7/1935  Miller......................179/175.2

Primary Examiner—Malcolm F. Hubler
Attorney—R. J. Guenther and William L. Keffauver

EXEMPLARY CLAIM

1. A testing circuit for testing the wiring of a panel, which panel includes groups of switches capable of advancing through successive positions and input terminals on said panel adapted to be connected via said switches operating in tandem stages to output terminals on said panel, said testing circuit comprising means for comparing said panel against a second similar panel and including means for applying test potentials to the input terminals of both panels, means for causing all switches of both panels to move in unison, means to compare the potentials on the output terminals of one panel with the potentials on the corresponding terminals of the other panel, means responsive to a different potential condition on corresponding output terminals of said two panels for stopping the movement of all of said switches on both panels and for marking the output terminal on which such different potential condition was found.

13 Claims, 3 Drawing Figures

TESTING CIRCUIT FOR A SECRET SIGNALING SYSTEM

The present invention relates to testing electrical equipment and more particularly to testing an apparatus unit or panel to determine existence of faulty wiring or wrong apparatus setting leading to errors in output.

An object of the invention is to test the wiring of an apparatus unit or panel and indicate automatically the occurrence of a fault and the part of the apparatus in which the fault occurs.

A related object, where the invention is used in connection with apparatus units incorporating moving switches, is to automatically stop the movement of the switches upon detection of a fault and to mark the part of the unit where the fault is to be found.

A further object of the invention is to compare one apparatus unit against another of like type to determine whether the wiring in one differs from that in the other.

While the invention is capable of general application, it will be disclosed herein specifically as applied to the testing of a pulse producing system or machine and a further object of the invention is to test one pulsing or pulse producing system against another to determine whether each is generating the same pulses as the other and in case of a difference to indicate such fact.

The pulse producing system disclosed will be assumed to be supplying key pulses to a secret signaling system. One such pulse producing apparatus is used for the transmitter and a duplicate pulse producing apparatus is used for the receiver. At one two-way terminal two such key pulse producers will be used, one for transmitting and the other for receiving. These pulse producers are, for security reasons, given a new setting from time to time, such as daily, in accordance with a prearranged program and the invention offers a rapid and convenient means of determining whether the two key pulse producers at a terminal have been correctly set up, by checking the operation of one key producing machine against the other.

The nature and objects of the invention will be more clearly understood from the following detailed description of an illustrative embodiment as shown in the attached drawings in which.

Figure 1:
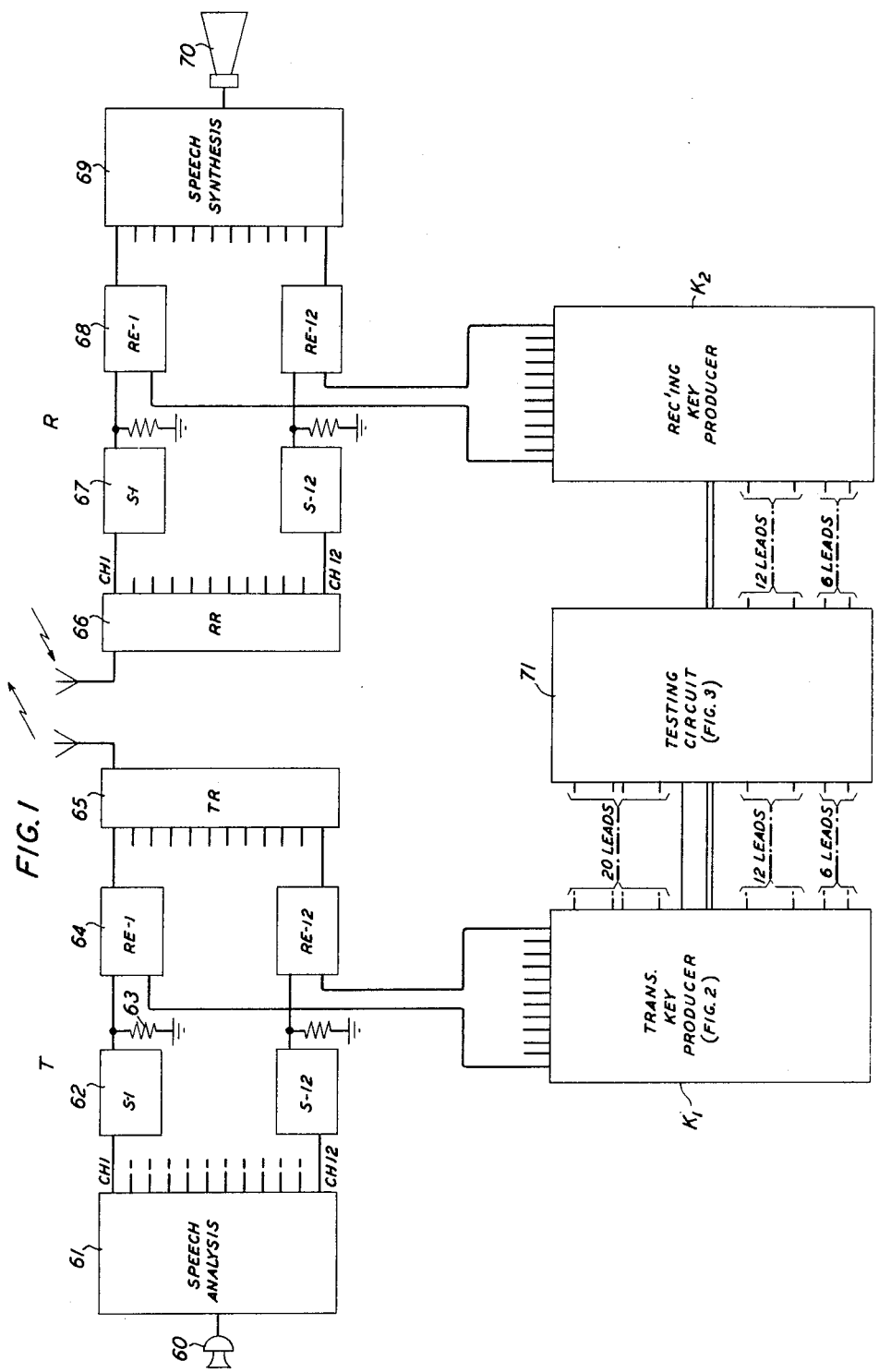
FIG. 1 is a block schematic layout of a complete two-way terminal station incorporating the testing circuit of the invention.

Referring first to FIG. 1, a two-way terminal of a secret speech system is shown in general outline comprising a transmitting terminal T and a receiving terminal R. Associated with the transmitting terminal is a key producer K1 for furnishing key pulses to the transmitting terminal for use in enciphering the speech message currents and a similar key producer K2 is associated with the receiving terminal R for enabling the received secret message to be deciphered.

The type of secret telephone system assumed in FIG. 1 is that disclosed in Lundstrom-Schimpf application Ser. No. 456,322, filed Aug. 27, 1942 and the key producers K1 and K2 replace the phonograph records disclosed in that application for furnishing the key pulses. In accordance with the Lundstrom-Schimpf disclosure speech spoken into microphone 60 is analyzed at 61 into low frequency speech-defining currents in 12 different channels. Each channel includes a stepper 62 containing a number of gas-filled tubes, different numbers of which fire in response to the strength of the current existing in the respective channel and set up current flow through the output resistors 63. Timing means are provided (but not shown herein) for causing the steppers 62 to be exposed on their input sides to the currents in respective channels at different time intervals so as to produce in the output resistors 63 flat-topped pulses of given duration. In order to encipher these pulses key pulses similarly timed but varying in amplitude in random manner are supplied to each of the 12 channels, these key pulses being obtained in the Lundstrom-Schimpf disclosure, as previously stated, from phonograph records but in the present instance being supplied from the transmitting key producer machine K1. The key pulses and the message pulses in each channel are combined in a reentry circuit 64, the outputs of which lead to an individual carrier channel, all 12 carrier channels being multiplexed upon a radio channel included in the box TR at 65 for transmission to the distant station.

Secret radio waves produced in a distant similar transmission station are received in the local radio receiver 66 and each of the multiplex carrier channels includes a detector and other suitable apparatus for reproducing in each of 12 channels low frequency speech-defining currents which have been combined with key pulses at the distant station. These are applied to individual steppers 67 similar to the steppers 62. The output currents from the steppers 67 are combined in reentry circuits 68 with key pulses from the receiving key producer K2 which is assumed to be running in close synchronism with the transmitting key producer of the distant station and to be producing key pulses identical with those used at the distant station for enciphering the message currents. As a result of the combination of the receiving key pulses with the received channel pulses there are produced in the output channels from the reentry circuits 68 low frequency speech-defining currents similar to those existing in the output of the speech analyzer of the distant station. These reproduced speech-defining currents are sent into the speech synthesizer 69 where they are used to control the construction of understandable speech currents for reproduction in receiver 70 or for impression upon a telephone circuit.

Each key producer K1, K2 includes a number of mechanically movable switches operating in a highly irregular manner to develop a complex arrangement of current values on a large number of terminals internal to the machine and twelve rotary distributors, one for each output channel conductor, for picking up these different current values in succession and delivering them in the form of timed pulses to the 12 outgoing conductors. For security reasons it is desirable to change the internal connections of the key producers at stated intervals, such as once every day. This may involve the changing of a large number of connectors, such as plugs on interconnecting panels and it is desirable before using the machines for message transmission to check the changes that have been made to ensure that they are correct.

The testing circuit 71 is shown in FIG. 1 as located between the transmitting key producer K1 and the receiving key producer K2 and as connected to each of these key producers for automatically testing them to detect faulty wiring or mistakes in resetting the machines for the day's run.

Figure 2:
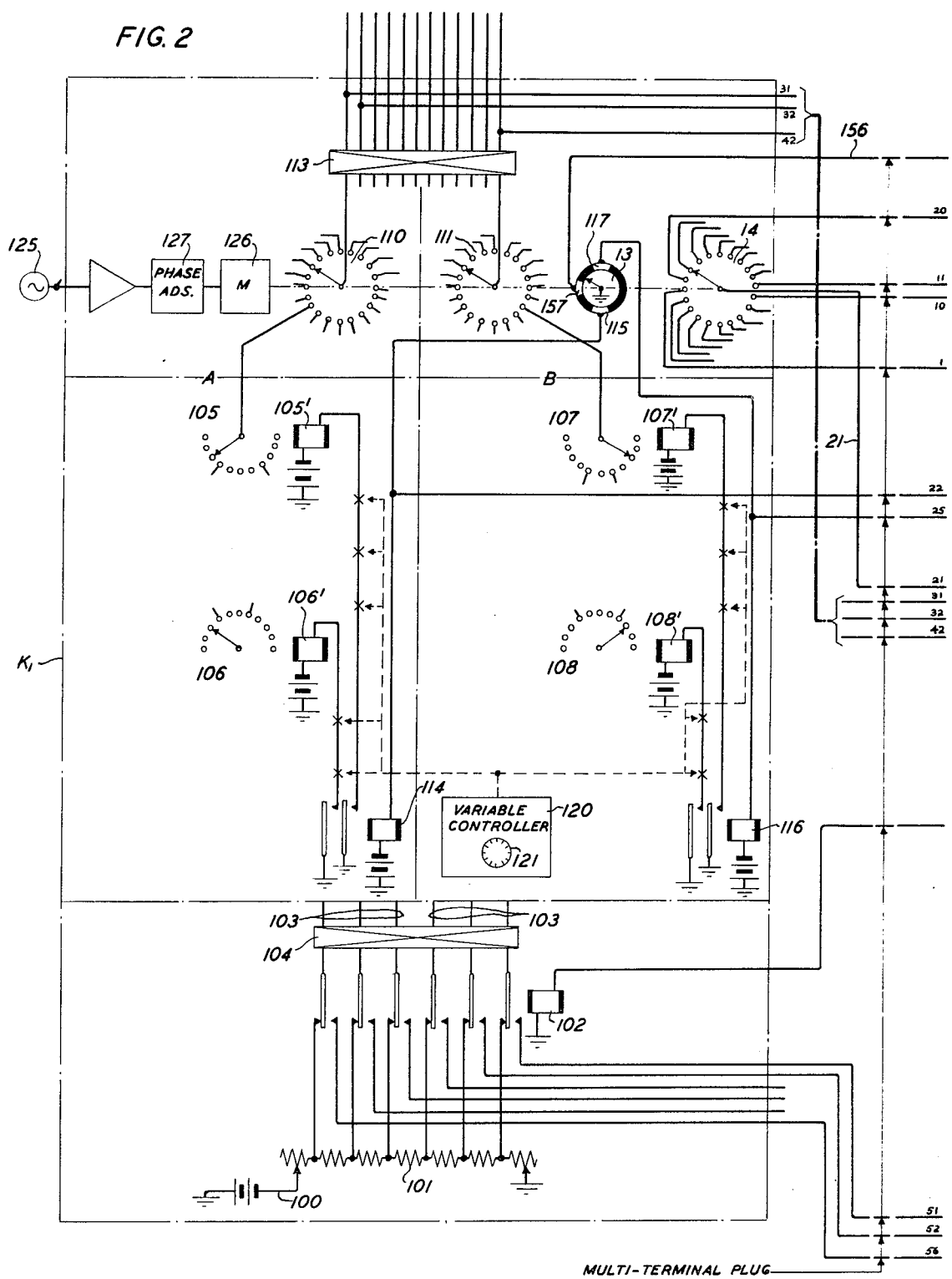
FIG. 2 is a simplified diagram of so much of the transmitting key producer or receiving key producer as is necessary for an understanding of the manner of application thereto of the testing circuit of the invention.

Before describing the testing circuit 71, it will be necessary to consider briefly the character of the apparatus contained in the key producers K1 and K2 by reference to FIG. 2 which applies specifically to K1, K2 differing only in the omission of certain elements as will appear from the subsequent description.

The pulses that are supplied to the different message channels for keying purposes vary in steps from zero to five steps, the pulses supplied to any channel varying among these values in random manner as previously stated. For the purpose of providing these different step values, a battery 100 and potentiometer 101 are provided with taps to the rest contacts of the six armatures of relay 102. In the normal use of the machine this relay is deenergized and the six voltages are supplied over the six conductors 103. An interconnecting panel 104 is shown for changing these six conductors among themselves as by means of patching cords. This is one of the places where circuit changes may be made from day to day in the wiring of the machine.

The switching apparatus within the key producer is divided into two sections A and B as indicated by broken lines in FIG. 2. Each of these sections includes a number of stepping switches of which two are shown in section A at 105 and 106 and two are shown in section B at 107 and 108. By means of multi-contact plugs and jacks, other step-by-step switches, bus bars, etc., the six voltages applied to the conductors 103 are distributed so as to have a large number of appearances upon switch terminals, such as 106 and 108 of which there may be a very large number in practice. Other switches of which 105 and 107 are representative hunt over these terminals and apply different voltages to the distributor segments of the 12 distributors of which only two are shown at 110 and 111. It will be understood that there will be six of these distributors in equipment group A and six in equipment group B. The brushes of the 12 distributors 110, 111 are connected to the twelve output terminals of the key producer by way of an interconnecting panel 113 which enables cross connections to be made by means of patching cords to interchange the 12 conductors in the desired manner. This panel, therefore, offers another point at which the wiring of the machine may be varied from time to time.

As noted, the switches 105 to 108 are caused to step in irregular manner. This is diagrammatically indicated in FIG. 2. For example, the stepping magnets 105' and 106' are energized over front contacts of stepping relay 114 which is energized and released from distributor face 13 whenever its grounded brush passes over segment 115. A similar stepping relay 116 is operated from segment 117. Considering stepping relay 114, the stepping magnets 105' and 106' are not necessarily energized and released each time relay 114 attracts and releases its armatures. The control paths for these stepping magnets are shown, by a series of x's, to contain other control points each of which may independently be controlled to be closed or opened at the time when relay 114 is actuated. These control points are arranged to be closed in an irregular manner so that the stepping of the various stepping switches is made irregular. The drawing diagrammatically shows how this may be done by means of a variable controller 120 which exerts an independent control on each of the control points in the energizing leads of the stepping magnets as shown by the dotted lines and arrows extending from the controller 120. For example, each of the control points may be a relay or it may be another stepping switch similar to 105, etc. In either case, the variable controller 120 generates pulses of irregular distribution or of varying combinations for variably actuating these relays or controlling switches. One way for doing this would be to provide a punched tape of the type used in printing telegraphs. Alternatively, the variable controller 120 may contain a rotating drum and contact makers for supplying stepping currents to the relays or switches at the various control points indicated. The variable controller 120 is shown as including a dial 121 which can be used for setting the controller 120 to a particular point in its cycle, such as at the beginning or zero position of its cycle.

Each of the distributors 110, 111 contains 20 segments. It will be understood that all of the brushes of these distributor faces may be mounted upon a single shaft which also carries the brushes of distributor face 13 and the brush of an additional distributor face 14 also containing 20 segments. The brush of distributor face 14 is wired to conductor 21 leading to the test panel and the 20 segments of distributor face 14 are individually wired to 20 conductors 1 to 20 leading to the test panel. All of these distributors are assumed to be driven from a synchronous motor 126 at constant speed from a standard frequency oscillator 125 which also drives the distributors of the K2 machine, so that the distributors of machines K1 and K2 at the same station are running in accurate synchronism with each other and with the similar key machines at the distant station which are driven from a standard frequency oscillator at that station.

Figure 3:
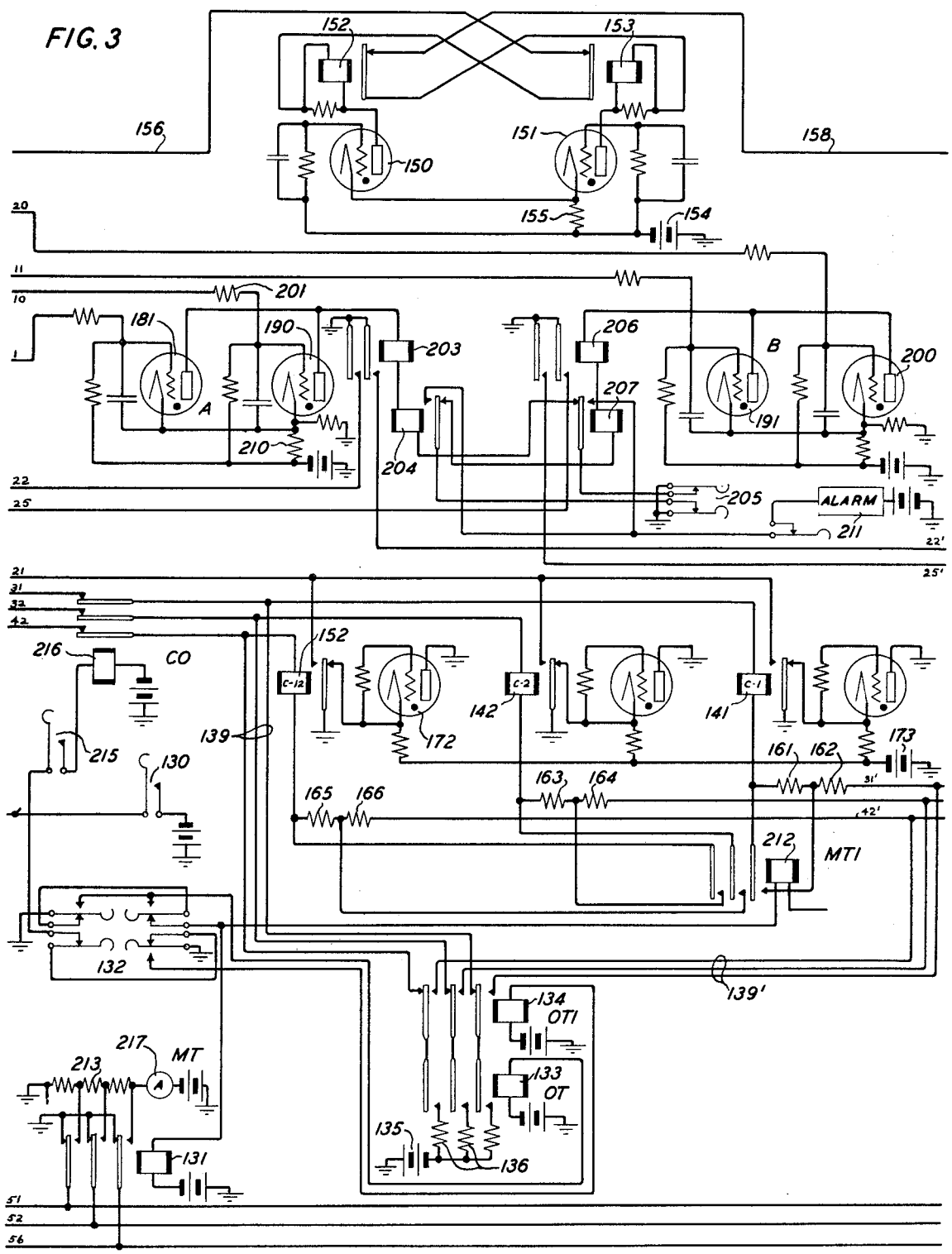
FIG. 3 is a schematic circuit diagram of the testing circuit in accordance with the invention.

Referring to FIG. 3 for a description of the test panel, this can best be described by taking up each part separately and describing its manner of use in making tests.

It will be assumed that the multiterminal plug indicated on FIG. 2 has been inserted to connect the testing circuit of FIG. 3 with key producer K1 of FIG. 2 and that a similar plug, with terminals corresponding to the leads shown in FIG. 1, has been inserted to connect the testing circuit to key producer K2 assumed to be at the right of FIG. 3.

Referring first to the top of the figure, a pair of synchronizing tubes 150 and 151 are shown, each of these being a gas-filled tube. The plate circuit of each tube contains a relay 152 or 153 shunting a corresponding resistance. Space current voltage for these tubes is supplied from battery 154 the negative pole of which is connected through resistance 155 to the cathodes of both tubes. The grids of these tubes are connected through time constant circuits to the negative pole of battery 154. When relay 153 is normal the space current for tube 150 is completed through the winding of relay 152 and its shunting resistance, armature and rest contact of relay 153 and conductor 156 to segment 157 of distributor face 13 in FIG. 2 to ground. Under these conditions, and also assuming that tube 151 is not conducting, each time the brush of distributor 13 applies ground to segment 157 tube 150 fires. Similarly the space current for tube 151 can be completed through winding of relay 153 and shunting resistance, armature and rest contact of relay 152 and conductor 158 to a segment on distributor 13' of the second key machine assumed to be on the right of FIG. 3 as indicated in FIG. 1. If the distributors of the two machines are running in synchronism and very nearly in phase with each other, such that ground is placed on conductor 156, an instant before ground is placed on conductor 158, tube 150 will fire and draw a sufficient amount of current through cathode resistor 155 to prevent tube 151 from firing because of the negative voltage applied to the grid of tube 151 from across resistor 155. In order to prevent tube 151 from firing when the brush of distributor 13 has passed off segment 157 and ground exists on conductor 158, relay 152 is provided to open the circuit of conductor 158 and hold this circuit open until time has been allowed for removing ground from conductor 158. Assuming on the other hand that the machine on the right of FIG. 3 is running slightly ahead so that ground appears on conductor 158 slightly before ground appears on conductor 156, tube 151 will flash and prevent the firing of tube 150. These tubes 150 and 151 have luminous discharge so they produce a visible light. The operator in lining up the machines adjusts phase shifter 127 in the circuit of the distributor driving motor of one or the other of the two machines so that with a slight movement of the phase controller forward or backward tube 150 will flash for one adjustment and tube 151 for the other adjustment. In this way the two machines can be phased in very accurately.

Before making any tests involving comparison between pulse producer machines K1 and K2, the variable controllers 120 of both machines are set to the same position, for example, to their normal or zero position so that both machines go through identical movements in accordance with one and the same pattern. After the tests have been completed, the controllers 120 of the two machines are given different settings so that when used as transmitting and receiving pulse producers, respectively, they generate unlike series of impulses.

OPEN CIRCUIT TEST

Before making any tests key 130 is closed energizing relay 102 in the machine K1 and a similar relay in machine K2. These relays cut off the normal voltage supply leads from potentiometer resistor 101 and connect the six input leads over conductors 51 to 56 to armatures of relay 131. When relay 131 is deenergized these leads 51 to 56 are all grounded. Since ground is applied to each of these leads continuously, if there is no open circuit connection in machine K1, a ground will appear on each one of the 12 output leads at the top of FIG. 2 in each position of the distributor 110, 111. Similarly, a ground will appear on each of the 12 output leads of the machine K2. The presence of an open in one of the machines may, therefore, be detected whenever an open appears on a segment of any of the distributors 110, 111 of one machine at the same instant that a ground appears on the corresponding segment of the opposite machine.

To test the K2 machine key 132 is thrown to the right energizing relays 133, 134. The former applies battery 135 through series resistors 136, armatures and front contacts to the armature of relay 134, and since this is energized, such battery is applied to each of the twelve leads in the group 139'. These grounds are, therefore, applied to the conductors 31' to 42' leading to the right. Going to the left from the junction points between conductor group 139' and leads 31' to 42', these grounds are extended through individual pairs of resistors 161, 162 and 163, 164 and 165, 166 to windings of relays 141, 142 to 152 to conductors 31 to 42. It will be understood that there are 12 of these relays 141 to 152. The 12 conductors 31 to 42 lead into the machine K1 where they connect respectively to the output terminals 1 to 12 at the top of FIG. 2. With both machines K1 and K2 running in synchronism and both applying grounds at the same instants to the output terminals 1 to 12, grounds are applied to both ends of the windings of relays 141 to 152 so that current from battery 135 is unable to energize any of these relays. Assuming, however, that there is an absence of ground in the machine K2 at the time when one of the brushes of distributors 110, 111 of machine K1 is applying ground to the corresponding output terminal of this machine, the corresponding relay 141 to 152 is energized since this ground is applied to one terminal of its winding and battery 135 is supplying ground through resistor 136 to the opposite terminal of such relay without a shunting ground being applied over the corresponding conductor 31' to 42'.

Assuming such relay is relay 152, for example, this relay pulls up its armature, thereby removing normal shunting ground from the cathode of gas tube 172 causing that tube to flash by allowing battery 173 to be applied to its cathode. The firing of this tube indicates to an attendant that an open is present in machine K2. The energization of relay 152 also places a ground on conductor 21 leading to the brush of distributor face 14 of machine K1 and this ground is extended over one of the conductors 1 to 20 to the grid of one of the 20 gas-filled tubes shown at 181 to 200. These 20 tubes are divided into two groups of 10 corresponding to the A and B equipments of the pulse producing machines, tubes 181 to 190 corresponding to group A and tubes 191 to 200 corresponding to group B. Assuming by way of example that the ground is applied to conductor 21 when the brush of distributor face 14 is in contact with segment 10, this ground is applied through series resistor 201 to the grid of tube 190 causing that tube to flash by sending its grid potential positive with respect to the cathode. The tube 190 when thus broken down gives a luminous discharge and also performs a circuit function by sending current through the windings of relays 203, 204 to ground through normal contact of key 205 and rest contact of relay 207. Any one of the tubes 181 to 200, when once fired in this manner, continues to pass current until the attendant opens the key 205. The voltage supplied to the cathodes of tubes 181 to 200 is taken from a voltage divider resistor, so that the grids are negative with respect to the cathode until a signal is received through face 14. When one tube of a group of 10 is conducting, none of the other nine will conduct, because the plate-cathode voltage has been reduced to the sustaining voltage of the tubes.

Relays 203 and 204 both energize as a result of the firing of a tube in the A group, in this case tube 190. Relay 204 in shifting its armature opens the energizing circuit for relays 206 and 207 in the B group and applies ground to the alarm 211 which emits a signal. Relay 203 in energizing applies grounds over conductors 22 and 22'. Conductor 22 leads to one terminal of the winding of stepping relay 114 in the A group of machine K1 and conductor 22' leads to the same point in the K2 machine. These stepping relays are, therefore, prevented from releasing their armatures and all of the stepping switches in the A group of each machine are, therefore, prevented from movement. The same circuit conditions remain, therefore, in the A group of each machine K1 and K2 and as long as the distributors continue to rotate the relay 152 is reenergized in each rotation of the distributors when the open conductor is encountered, thus causing the tube 172 to continue to flash. The application of ground at these times at conductor 21 is without effect, however, since the corresponding tube in the group 181 to 190 is already in fired condition.

The attendant disconnects driving current from oscillator 125 to the motor 126 of both machines allowing the distributors to come to rest. The attendant may then turn the shafts of the distributors of both machines by hand, until segment 10 is reached. This is the distributor segment which fired tube 190. With the distributor in position 10, relay 152 will energize and fire tube 172. The illumination of the tube 172 and the tube 190 indicates to the operator that the open exists on channel 12 and on segment 10 of the corresponding distributor. It is also known that the open exists in the K2 machine since the key 132 is thrown to the right. With this information the attendant can find the point where the open occurs by simple routine tests.

Machine K1 is tested for opens in the same manner except that in this case the key 132 is thrown to the left. This causes energization of relay 133 as before but relay 134 remains unenergized. Battery 135 is, therefore, applied through resistors 136 to the conductor group 139 leading to conductors 31 to 42. If in making the tests of machine K1 an open appears on any of the 12 output terminals at the same time that a ground appears on the corresponding terminal of the K2 machine, the absence of a shunting ground on the conductor 31, etc. allows the corresponding relay 141, etc. to become energized and set in train a series of operations as previously set forth. In this connection it will be noted that the distributor face 14 of the one machine K1 serves to mark the segment on which the trouble is to be found, whether this be in the K1 machine or in the K2 machine, since the distributors of both machines run in synchronism and phase.

MATCHING TEST

In making this test six different voltages are applied to the six conductors 51 to 56 leading to the input terminals of both key machines and the 12 output terminals of one machine are matched against the 12 output terminals of the other machine, all 12 simultaneously, to determine whether the same or a different voltage exists on corresponding terminals. For example, the different steps of voltage introduced into the leads 51 to 56 may differ by 10 volts per step so that in case of a wrong connection in one of the machines the difference in voltage between corresponding terminals may be 10 to 50 volts.

In making the matching test the key 132 is in its central or normal position causing the energization of relays 131 and 212. Relay 131 in shifting its armatures connects the six different voltages (including ground), referred to above, from potentiometer 213 to the conductors 51 to 56. Relay 212 in shifting its armatures short-circuits resistances 161, 163, 165, etc., one resistance for each of the relays 141 to 152, so that these resistances are removed from the energizing circuits of these relays for the matching test.

With both machines running in synchronism and in phase, if the connections have been properly made in both machines when a voltage appears, for example, on output terminal 1 of machine K1, this will apply the same voltage over conductor 31 to the corresponding end of the winding of relay 141 as is applied to the opposite end of the winding from the machine K2 over conductor 31'. The relay will in this case not energize. If during the rotation of the distributors 110, 111 in both machines a terminal is found on which a difference of one or more voltage steps appears with respect to the corresponding terminal of the opposite machine, the corresponding relay 141 to 152 energizes due to this difference of potential, causing the corresponding tube, such as 172, to fire. As in the previously described test, such relay in energizing applies ground to conductor 21 leading to the brush arm of distributor face 14, this ground in turn causing one of the 20 tubes in the two groups 181 to 190 and 191 to 200 to fire and remain lighted. Depending upon the group to which such lighted tube belongs, either the pair of relays 203, 204 or 206, 207 energize and ground the lead 22, 22' or lead 25, 25' to stop the machines from taking any further steps. The attendant then, as in the previously described test, shuts down the distributors of both machines and turns them by hand to the segment indicated by the tube fired in the group 181 to 200. The relay 141 to 152 now operates and fires the corresponding tube such as 172. The lighting of this tube and of the already lighted tube in the group 181 to 190 or 191 to 200 identifies the channel in which the error exists and also the segment of the distributor corresponding to the circuit where the error exists. The operator may then proceed by routine methods to trace the key circuit path until the mistake in wiring or changeable connections is found. Before doing this the attendant presses the key 215 to energize cut-off relay 216 which opens the twelve leads 31 to 42 extending across from one machine to the other, this facilitates testing by preventing the voltages of one machine from backing up into the other. After the trouble is found and corrected key 205 is momentarily opened to restore the lighted tube 181 to 200, and key 215 is opened. The machines will again be started and the test continued.

In making the matching test a test may also be made for crosses and false grounds in either machine by observing the ammeter 217 connected in series with the potentiometer supply resistance 213. The existence of a cross or false ground in either machine results in short-circuiting one or more sections of the resistance 213, thereby increasing the current flow through ammeter 217, causing it to swing in the direction of increased current. By noting whether these swings occur the attendant is enabled to detect the existence of these troubles.

What is claimed is:

1. A testing circuit for testing the wiring of a panel, which panel includes groups of switches capable of advancing through successive positions and input terminals on said panel adapted to be connected via said switches operating in tandem stages to output terminals on said panel, said testing circuit comprising means for comparing said panel against a second similar panel and including means for applying test potentials to the input terminals of both panels, means for causing all switches of both panels to move in unison, means to compare the potentials on the output terminals of one panel with the potentials on the corresponding terminals of the other panel, means responsive to a different potential condition on corresponding output terminals of said two panels for stopping the movement of all of said switches on both panels and for marking the output terminal on which such different potential condition was found.

2. A testing circuit according to claim 1 in which said panel includes distributor devices having segments wired individually to certain of said switches for establishing current paths between said switches and said output terminals, said testing circuit including means responsive to a different potential condition on corresponding output terminals of said two panels for also marking the distributor segment through which a current path extends to the output terminal on which such different potential is found.

3. A testing circuit for an apparatus equipment which contains output terminals and means for establishing potential conditions on individual output terminals depending upon the position of both continuously moving switching means and intermittently moving switching means within the apparatus to be tested, said testing circuit comprising means to compare said apparatus equipment against a duplicate apparatus equipment the switching means in which are moving in step with the corresponding switching means of the apparatus equipment under test and including means to compare the potentials existing on each terminal of the equipment under test with the potential simultaneously existing on the corresponding terminal of the duplicate equipment, terminal by terminal, means responsive to a different potential condition on corresponding output terminals of said two equipments for preventing further movement of said intermittently moving switching means and for marking the output terminal on which such different potential condition was found, and means for marking the position through which said continuously moving switching means were passing at the instant when such different potential condition was found.

4. A testing circuit for a wired panel including movable switches operating in tandem stages to establish conductive paths between a plurality of input terminals and individual output terminals, said testing circuit comprising means to compare said panel against a duplicate panel and including means to compare the potential conditions on corresponding output terminals of the two panels, and means responsive to a different potential condition on an output terminal of one panel with respect to the corresponding output terminal of the other panel for arresting the movement of said switches on both panels and marking the output terminal on which such difference in potential condition was found.

5. In apparatus involving input terminals on which different voltages are adapted to be impressed and containing movable switching mechanism for distributing said voltages in varied order to a plurality of output terminals, a testing circuit for testing the internal wiring of said apparatus comprising means to compare said apparatus against a duplicate apparatus, means to impress the same voltages on the same input terminals of both apparatuses, said voltages varying in similar manner on the terminals of both apparatuses, and means to test the voltage appearing on each output terminal of the first apparatus with the voltage appearing at the same time on the corresponding output terminal of the duplicate apparatus, means responding to a difference of potential on one output terminal relative to that on the corresponding terminal of the other apparatus and means operated from said responding means to stop the movement of said switching mechanism and to mark the output terminal on which such difference of potential is present.

6. A circuit for testing a wired equipment for open circuits, said equipment containing moving switch mechanism for conductively connecting different input terminals in varying orders, changing with time, to each of a plurality of output terminals, said circuit comprising means to compare said equipment against a duplicate equipment and including a separate circuit extending from each output terminal of one equipment to the corresponding output terminal of the other equipment, a current responsive element serially included in each such separate circuit, means to apply the same voltage to the input terminals of both equipments, means to apply a different voltage to the terminals of said elements remote from the duplicate equipment whereby the presence of an open circuit condition on an output terminal of only the equipment that is under test allows the corresponding element to operate from current flowing through the corresponding output terminal of the duplicate equipment, and means controlled by operation of said element for stopping the movement of said switch mechanism and for giving an indication of the output terminal on which said open circuit condition was found.

7. A testing circuit for a pulse producing system which includes intermittently operating switching devices and cyclically operating switching devices operating in dependence upon each other to produce output pulses at timed intervals, said testing circuit comprising means to receive said pulses from the system under test and simultaneously to receive similar pulses from a duplicate system, and including means responsive to the presence of a pulse in the output of one system and absence of a corresponding pulse in the output of the other system for stopping the movement of certain of said devices in both systems and indicating the point in the operating cycle of others of said devices at which said pulse was produced with absence of a corresponding pulse in the output of the other system.

8. A testing circuit for a pulse generating system for producing output pulses in timed intervals, said system having rotating time division means for timing the pulses and switch mechanism adapted to be advanced through successive positions for supplying currents to said time division means, said testing circuit including means for comparing the pulses generated by said system with the pulses generated by a duplicate system, means responsive to the condition of occurrence of a pulse in the output of one of said systems and the absence of a similar pulse at the same time in the output of the other system for stopping the movement of said switch mechanisms in both systems and for marking the time division in which said condition was found.

9. The method of comparing one wired assemblage of electrical equipment against a duplicate wired assemblage to detect lack of correspondence in internal wiring of the two assemblages, each assemblage including input terminals, output terminals and step-by-step switches and continuously operating switches adapted for tandem operation between said input terminals and said output terminals, said method comprising the steps of providing branched connections between an indicator, points in one assemblage, and analogous points in the other assemblage, synchronously operating the switches of both said assemblages, causing said switches to apply to both sides of said indicator the same voltage when the wiring in both assemblages through the respective switch points is identical and to apply to opposite sides of said indicator a difference in voltage when the wiring is not the same through the respective switch points, and automatically stopping the movement of the switches in both assemblages in response to application of said difference in voltage to said indicator.

10. The invention claimed in claim 9 in which said continuously operating switches require time to stop and in which means are provided for marking the switch point through which the switch was extending its connection at the instant when said difference in voltage was applied to said indicator.

11. The invention claimed in claim 2 in which said testing circuit may be conditioned to test said panel for an open circuit erroneously existing on one of said terminals.

12. The invention claimed in claim 2 in which said testing circuit may be conditioned to test said panel for lack of match between the various voltages that may exist on corresponding terminals of said respective panels.

13. A testing circuit for a wired assemblage for comparing the wiring against a similar panel to indicate lack of correspondence between the wirings of said panels, connections between said indicator and analogous points in both systems, each panel including moving multiterminal switches which are supposed to operate synchronously in the two systems, causing said switches to apply voltages from the respective switch points to opposite sides of said indicator, thereby giving an indication whenever unequal voltages are applied, indicating a difference in the two wirings, said arrangements including provision for stopping the stepping of step-by-step switches and marking the regular position of the continuously operating switches, substantially as disclosed.

* * * * *